and> United States Patent
Wenger et al.

(10) Patent No.: US 12,200,259 B2
(45) Date of Patent: *Jan. 14, 2025

(54) METHOD AND DEVICE USING HIGH LAYER SYNTAX ARCHITECTURE FOR CODING AND DECODING

(71) Applicant: TENCENT AMERICA LLC, Palo Alto, CA (US)

(72) Inventors: Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 18/071,859

(22) Filed: Nov. 30, 2022

(65) Prior Publication Data
US 2023/0086585 A1 Mar. 23, 2023

Related U.S. Application Data

(63) Continuation of application No. 16/783,406, filed on Feb. 6, 2020, now Pat. No. 11,589,076, which is a (Continued)

(51) Int. Cl.
H04N 19/66 (2014.01)
H04N 19/127 (2014.01)
(Continued)

(52) U.S. Cl.
CPC ........... H04N 19/66 (2014.11); H04N 19/127 (2014.11); H04N 19/177 (2014.11);
(Continued)

(58) Field of Classification Search
CPC .... H04N 19/66; H04N 19/177; H04N 19/196; H04N 19/44; H04N 19/70
See application file for complete search history.

(56) References Cited

U.S. PATENT DOCUMENTS

2005/0123055 A1 6/2005 Winger
2006/0050793 A1 3/2006 Wang et al.
(Continued)

FOREIGN PATENT DOCUMENTS

KR 10-2016-0072153 A 6/2016
KR 10-2016-0132878 A 11/2016

OTHER PUBLICATIONS

Communication dated Sep. 24, 2024 issued by the Korean Patent Office in application No. 10-2024-7017655.

Primary Examiner — Farhan Mahmud
(74) Attorney, Agent, or Firm — Sughrue Mion, PLLC

(57) ABSTRACT

A method of and a device for decoding a coded picture coded according to a video codec technology or standard that uses a syntax structure including a Picture Header and at least one Picture Parameter Set (PPS) are provided. The method includes decoding, by a decoder, the Picture Header, the Picture Header including transient information pertaining to a plurality of Coding Units of the coded picture, and the transient information of the Picture Header including at least one reference to the at least one PPS, and further including at least one first syntax element pertaining to an aspect of the video codec technology or standard for decoding. The method further includes activating, by the decoder, a PPS of the at least one PPS that is decoded, the PPS including a second syntax element pertaining to the aspect of the video codec technology or standard for decoding.

20 Claims, 8 Drawing Sheets

Related U.S. Application Data continuation of application No. 16/232,566, filed on Dec. 26, 2018, now Pat. No. 10,595,048.

(60) Provisional application No. 62/730,885, filed on Sep. 13, 2018.

(51) Int. Cl.
    *H04N 19/169*    (2014.01)
    *H04N 19/177*    (2014.01)
    *H04N 19/196*    (2014.01)
    *H04N 19/44*    (2014.01)
    *H04N 19/463*    (2014.01)
    *H04N 19/70*    (2014.01)

(52) U.S. Cl.
    CPC ......... *H04N 19/188* (2014.11); *H04N 19/196* (2014.11); *H04N 19/44* (2014.11); *H04N 19/463* (2014.11); *H04N 19/70* (2014.11)

(56) References Cited

U.S. PATENT DOCUMENTS

| | | |
|---|---|---|
| 2008/0310500 A1 | 12/2008 | Winger |
| 2013/0070841 A1* | 3/2013 | Wahadaniah ........ H04N 19/573 375/240.02 |
| 2015/0103887 A1 | 4/2015 | Ramasubramonian et al. |
| 2015/0103928 A1 | 4/2015 | Seregin et al. |
| 2015/0195577 A1 | 7/2015 | Hannuksela |
| 2015/0264370 A1 | 9/2015 | Ramasubramonian et al. |
| 2015/0373361 A1 | 12/2015 | Wang et al. |
| 2017/0237999 A1 | 8/2017 | Hendry et al. |
| 2017/0339421 A1 | 11/2017 | Wang |
| 2018/0343478 A1 | 11/2018 | Cain et al. |

\* cited by examiner

METHOD AND DEVICE USING HIGH LAYER SYNTAX ARCHITECTURE FOR CODING AND DECODING

CROSS-REFERENCE TO THE RELATED APPLICATIONS

This application is a continuation of U.S. application Ser. No. 16/783,406, filed on Feb. 6, 2020, which is a continuation of U.S. application Ser. No. 16/232,566, filed on Dec. 26, 2018, now U.S. Pat. No. 10,595,048, issued on Mar. 17, 2020, claiming priority based on U.S. Provisional Application No. 62/730,885, filed on Sep. 13, 2018, the disclosures of which are incorporated herein by reference in their entireties.

FIELD

Methods and devices consistent with embodiments relate to video coding and decoding, and more specifically, a method and device using a high layer syntax architecture for coding and decoding. In particular, the precedence and persistence of high level syntax parameters coded in parameter sets, such as sequence and picture parameter sets, and certain high level headers such as Picture Headers are disclosed.

BACKGROUND

Video coding and decoding using inter-picture prediction with motion compensation has been previously used. Uncompressed digital video can consist of a series of pictures, each picture having a spatial dimension of, for example, 1920×10×0 luminance samples and associated chrominance samples. The series of pictures can have a fixed or variable picture rate (informally also known as frame rate) of, for example, 60 pictures per second or 60 Hz. Uncompressed video has significant bitrate requirements. For example, 10×0p60 4:2:0 video at x bit per sample (1920×10×0 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

Certain video codecs before H.264 such as, for example, MPEG-2 visual used a hierarchy of transient headers, including a sequence header, group of picture (GOP) header, picture header, and slice header. Syntax elements included in each header pertain to all underlying syntax structures. For example, syntax elements of the sequence header pertain to all GOPs included in the sequence, all pictures included in those GOPs, and all slices included in those pictures. Syntax elements of the GOP header pertain to all pictures included in the GOP, and all slices in the pictures. Such a hierarchical structure can lead to efficient coding but suboptimal error resilience properties. For example, if the vital information of a sequence header is lost in transmission, none of the GOPs, pictures, or slices of the sequence can be decoded.

Certain ITU and MPEG video codecs from 2003 onwards, namely H.264 and H.265, do not use transient headers above the slice header. Instead, they rely on parameter sets. On each syntactical level, such as sequence or picture level, one or more parameter set may be received by the decoder from the bitstream or by external means. Which of these (potentially many) parameter sets of the same type are being used for the decoding of a given sequence or picture depends on the reference coded in, for example, the slice header (for the picture parameter set, PPS) or the PPS (for the sequence parameter set, SPS). This architecture can have the advantage that the relevant parameter sets can be reliably sent even if the bitstream itself is sent over a lossy channel, or that the likelihood of their reception can be increased through the sending of redundant copies, potentially well in advance of their first use. One disadvantage can be that the sending of a parameter set can be more costly, in terms of bits required for the same number and types of syntax elements than the sending of MPEG-2 style headers. Further, certain syntax elements that change frequently from picture to picture but stay constant within a given picture may, under this architecture, be included in the form of multiple redundant copies in each slice header. While doing so can make the slices independently decodable (at least from a parsing dependency end entropy decoding viewpoint), it can cost further bits.

During the design of H.264, the independent decodability of slices was considered a major design goal, for error resilience reasons. Since 2003, however, improvements in the network architectures used for conveying coded video, as well as advances in the prediction mechanism, have made the independent decodability of slices considerably less attractive, as the concealment of a lost slice has become less and less effective.

SUMMARY

As a result of the shift in requirements away from independent decodability of slices, there is a need for a new high level syntax architecture that maintains good error resilience properties under the assumption that a loss at least some given picture can be reasonably concealed in a decoder, and leverages the advantages of the MPEG-2 style header structures in terms of coding efficiency. Some embodiments of this disclosure provide for such a high level syntax architecture that maintains good error resilience properties and coding efficiency.

According to an aspect of the disclosure, a method may be for decoding a coded picture coded according to a video codec technology or standard that uses a syntax structure including a Picture Header and at least one Picture Parameter Set (PPS). The method may comprise decoding, by a decoder, the Picture Header, the Picture Header comprising transient information pertaining to a plurality of Coding Units of the coded picture, and the transient information of the Picture Header including at least one reference to the at least one PPS, and may further include at least one first syntax element pertaining to an aspect of the video codec technology or standard for decoding. The method may further comprise activating, by the decoder, a PPS of the at least one PPS that is decoded. The PPS may comprise a second syntax element pertaining to the aspect of the video codec technology or standard for decoding.

According to an aspect of the disclosure, a device may be for decoding a coded picture coded according to a video codec technology or standard that uses a syntax structure including a Picture Header and at least one Picture Parameter Set (PPS). The device may comprise a decoder configured to decode the Picture Header. The decoder may be further configured to activate a PPS of the at least one PPS that is decoded. The Picture Header may comprise transient information pertaining to a plurality of Coding Units of the coded picture. The transient information of the Picture Header may include at least one reference to the at least one PPS, and further include at least one first syntax element pertaining to an aspect of the video codec technology or standard for decoding. The PPS may comprise a second syntax element pertaining to the aspect of the video codec technology or standard for decoding.

According to an aspect of the disclosure, a non-transitory computer-readable medium storing instructions may be used. The instructions may comprise: one or more instructions that, when executed by one or more processors of a device, may cause the one or more processors to decode a coded picture coded according to a video codec technology or standard that uses a syntax structure including a Picture Header and at least one Picture Parameter Set (PPS). The instructions may cause the one or more processor to decode the coded picture by causing the one or more processor to decode the Picture Header and activate a PPS of the at least one PPS that is decoded. The Picture Header may comprise transient information pertaining to a plurality of Coding Units of the coded picture. The transient information of the Picture Header may include at least one reference to the at least one PPS, and may further include at least one first syntax element pertaining to an aspect of the video codec technology or standard for decoding. The PPS may comprise a second syntax element pertaining to the aspect of the video codec technology or standard for decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
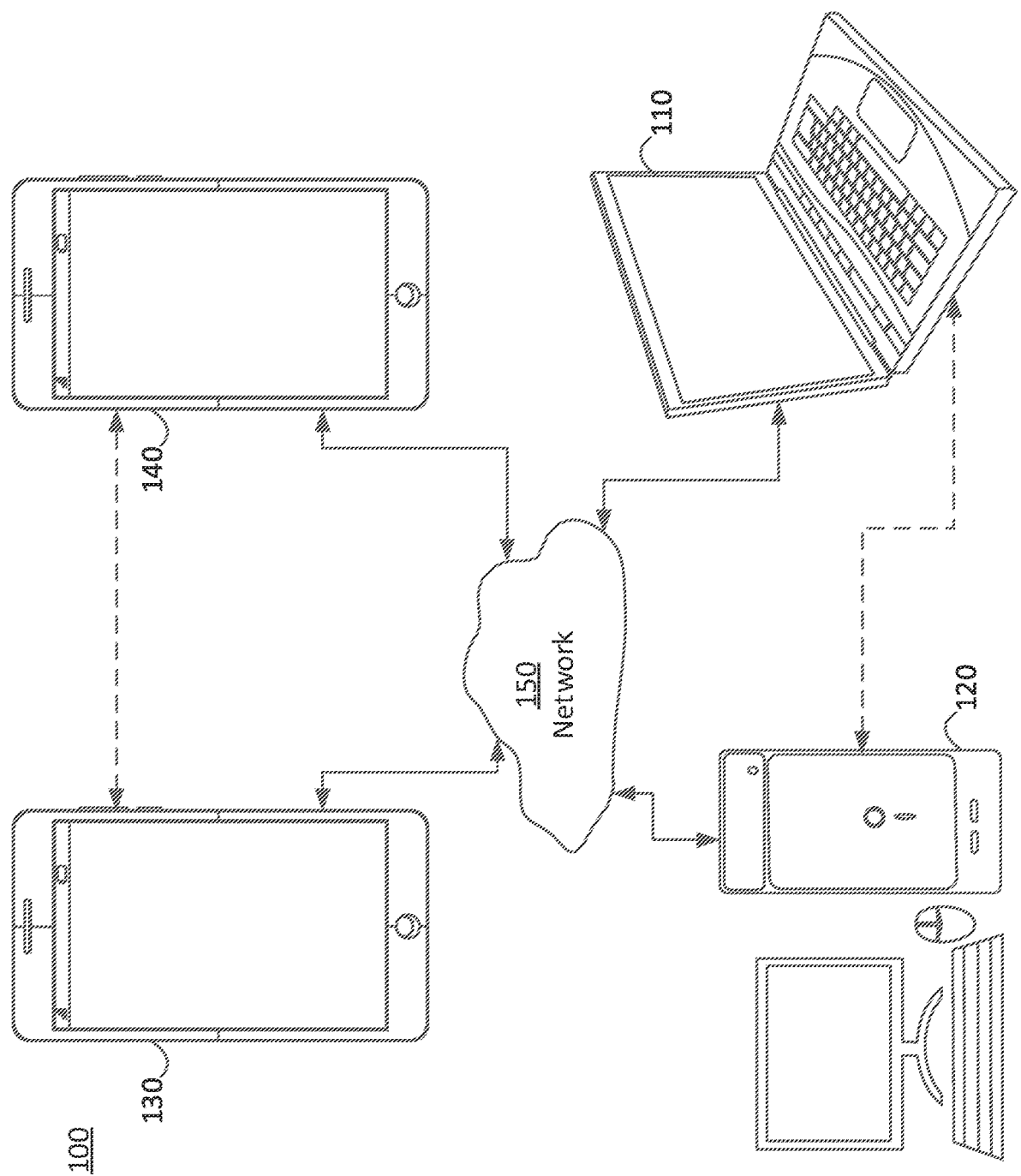
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be, for example, servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140) including, for example, wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
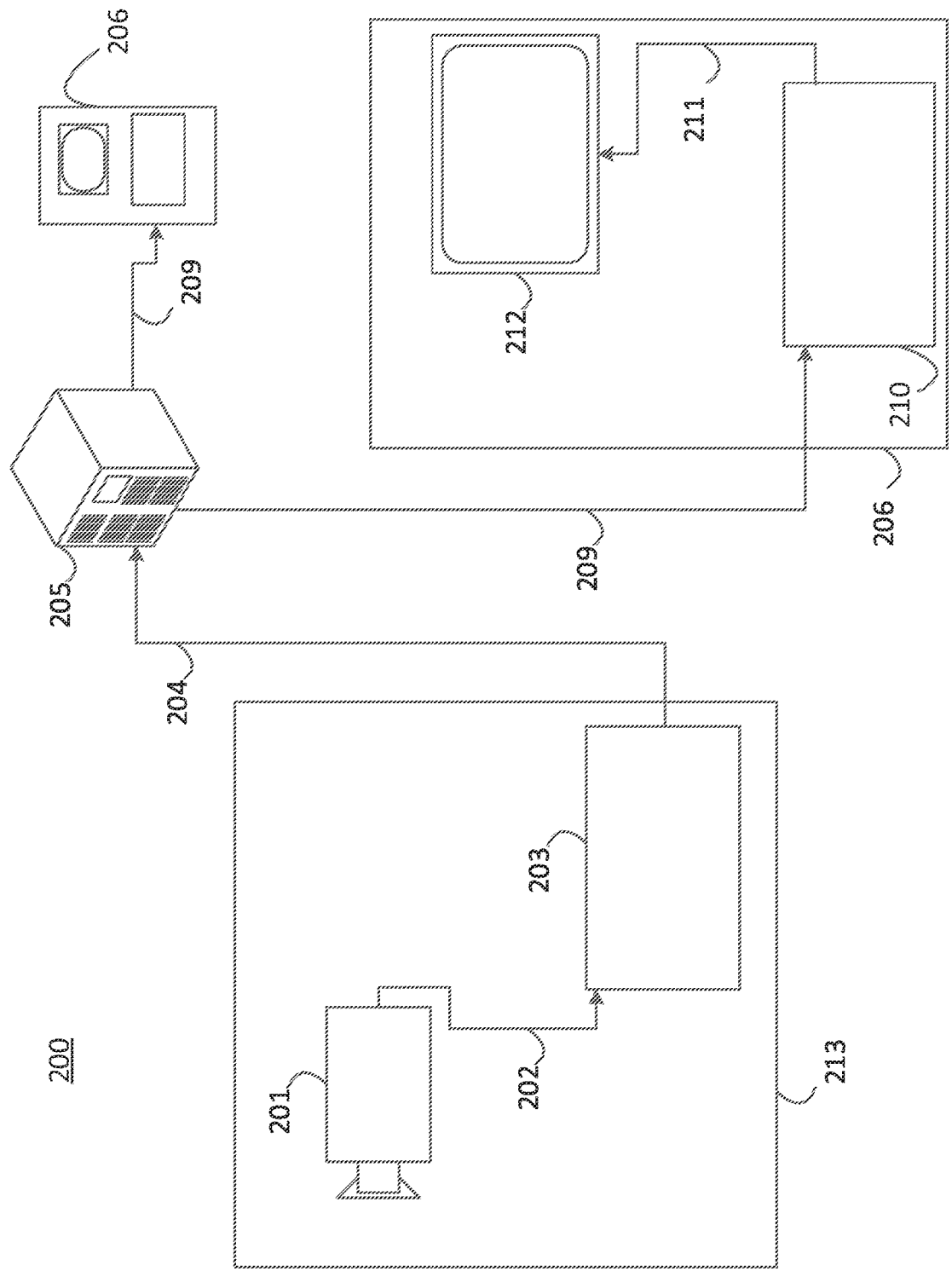
FIG. 2 is a schematic illustration of a simplified block diagram of a streaming system in accordance with an embodiment.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system (200) may include a capture subsystem (213), that includes a video source (201) and an encoder (203). The streaming system (200) may further include at least one streaming server (205) and/or at least one streaming client (206).

The video source (201) can create, for example, an uncompressed video sample stream (202). The video source (201) may be, for example, a digital camera. The sample stream (202), depicted as a bold line to emphasize a high data volume when compared to encoded video bitstreams, can be processed by the encoder (203) coupled to the camera (201). The encoder (203) can include hardware, software, or a combination thereof to enable or implement aspects of the disclosed subject matter as described in more detail below. The encoder (203) may also generate an encoded video bitstream (204). The encoded video bitstream (204), depicted as a thin line to emphasize a lower data volume when compared to the uncompressed video sample stream (202), can be stored on a streaming server (205) for future use. One or more streaming clients (206) can access the streaming server (205) to retrieve video bit streams (209) that may be copies of the encoded video bitstream (204).

The streaming clients (206) can include a video decoder (210) and a display (212). The video decoder (210) can, for example, decode video bitstream (209), which is an incoming copy of the encoded video bitstream (204), and create an outgoing video sample stream (211) that can be rendered on the display (212) or another rendering device (not depicted). In some streaming systems, the video bitstreams (204, 209) can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
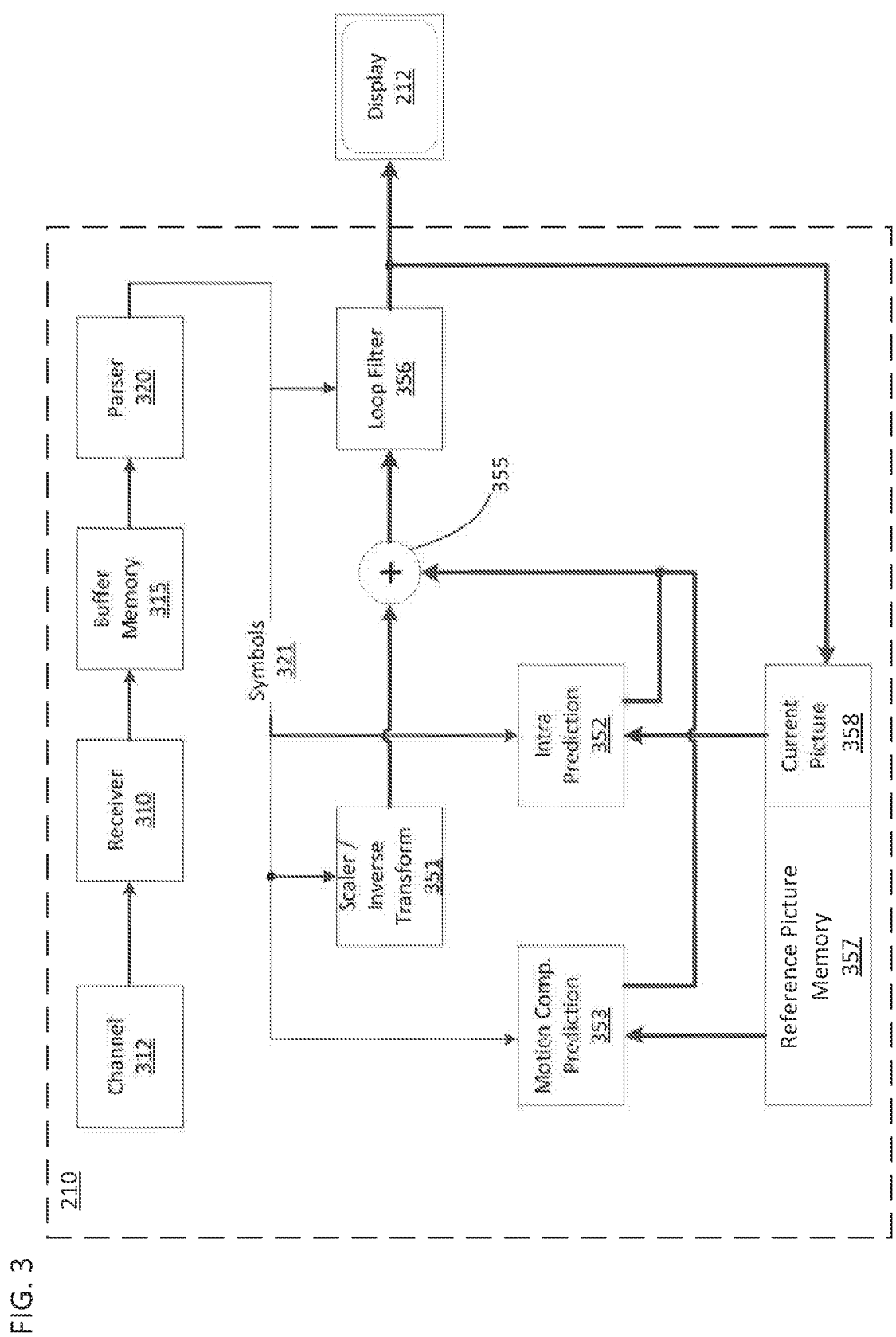
FIG. 3 is a schematic illustration of a simplified block diagram of a video decoder and a display in accordance with an embodiment.

FIG. 3 illustrates an example functional block diagram of a video decoder (210) that is attached to a display (212) according to an embodiment of the present disclosure.

The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory (358). In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosychronous network, the buffer (315) may not be used, or can be small. For use on best effort packet networks such as the Internet, the buffer (315) may be required, can be comparatively large, and can be of adaptive size.

The video decoder (210) may include the parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how they are involced, can be controlled by the subgroup control information that was parsed from the coded video sequence by the parser (320). The flow of such subgroup control information between the parser (320) and the multiple units described below is not depicted for clarity.

Beyond the functional blocks already mentioned, the decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) can output blocks comprising sample values that can be input into the aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by the intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access the reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so to generate output sample information. The addresses within the reference picture memory (357), from where the Motion Compensation Prediction unit (353) fetches prediction samples, can be controlled by motion vectors. The motion vectors may be available to the Motion Compensation Prediction unit (353) in the form of symbols (321) that can have, for example x, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to a render device such as a display (212), as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture stored in the current picture memory (358) can become part of the reference picture memory (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
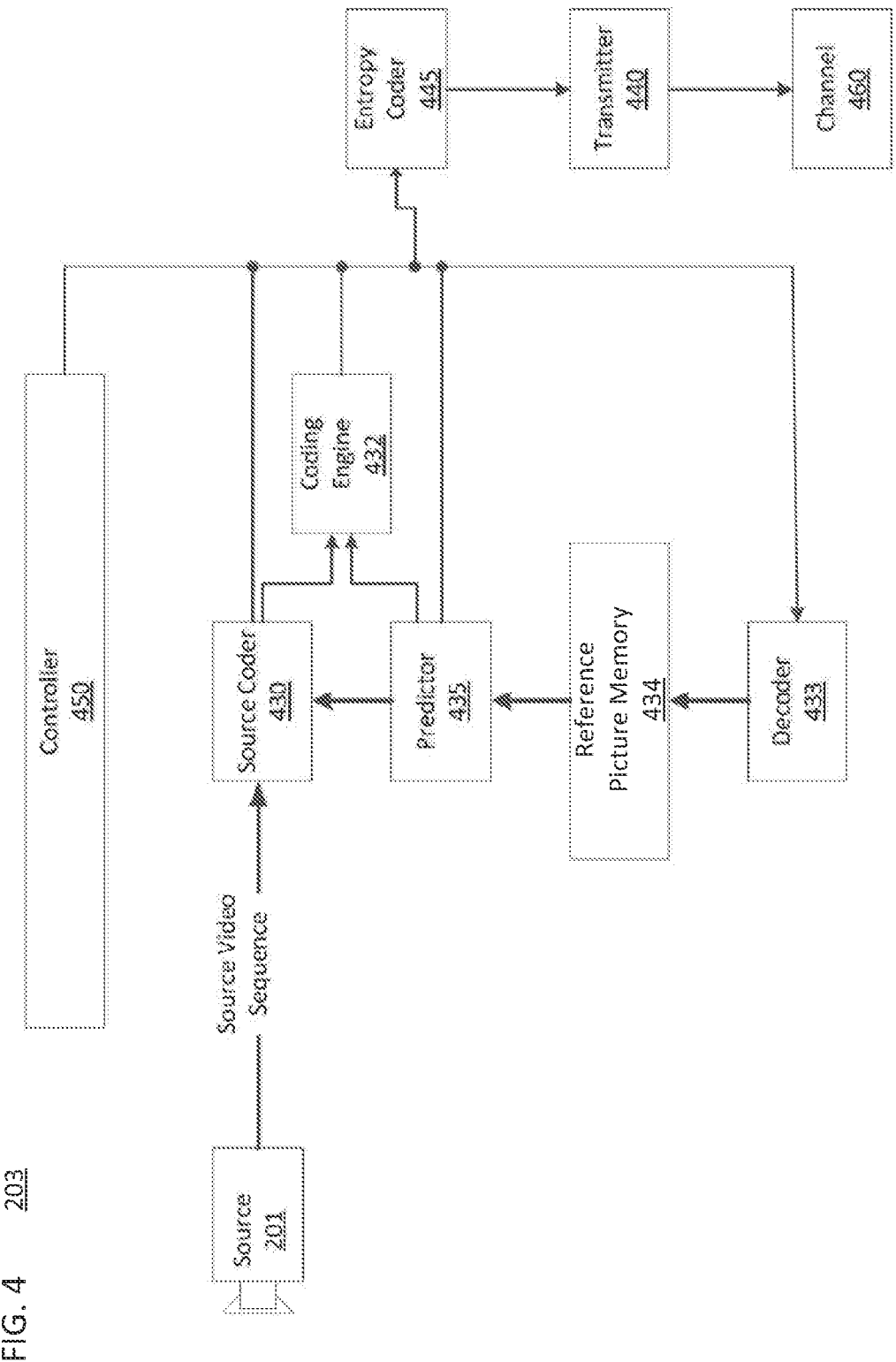
FIG. 4 is a schematic illustration of a simplified block diagram of a video encoder and a video source in accordance with an embodiment.

FIG. 4 illustrates an example functional block diagram of a video encoder (203) associated with a video source (201) according to an embodiment of the present disclosure.

The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: x bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed may be one function of the controller (450). The controller (450) may also control other functional units as described below and may be functionally coupled to these units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As a simplified description, a coding loop can consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create, when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) can be substantially the same as of a "remote" decoder (210), which has already been described in detail above in conjunction with FIG. 3. However, as symbols are available and en/decoding of symbols to a coded video sequence by the entropy coder (445) and the parser (320) can be lossless, the entropy decoding parts of decoder (210), including channel (312), receiver (310), buffer (315), and parser (320) may not be fully implemented in the local decoder (433).

An observation that can be made at this point is that any decoder technology, except the parsing/entropy decoding that is present in a decoder, may need to be present in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data is decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive Picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Described below are aspects of some embodiments of the disclosure, including a high level syntax architecture to be implemented in a video codec technology or standard, as for example Versatile Video Coding (VVC):

The high level syntax architecture may include the NAL unit concept of H.264 as it has proven to be useful, and because at least some system specifications (to include certain file formats) rely on it.

The high level syntax architecture may, optionally, not include the concept of (independent, regular) slices. The advances in video coding since 2003 (H.264 version 1's publication date) have been such that slice based error concealment has become, in many cases, practically impossible due to the ever increasing number and efficiency of in-picture prediction mechanisms. At the same time, due to such prediction mechanisms, the use of slices has become in certain cases prohibitively expensive from a coding efficiency viewpoint. As a result, very few implementations have recently used slices for their intended purpose (MTU size matching). Instead, substantially all applications that require low delay error resilience rely on picture-based error resilience tools such as intra refresh, open GOPs, scalability with uneven protection of the base layer, etc.

With slices removed, the smallest VCL syntax unit of the high level syntax architecture that is independently decodable on the entropy level (i.e., without parsing dependencies) may be, for example, a Tile or a Coded Picture.

Independent decoding of Tiles can be useful for certain application scenarios. For example, consider a cube map. From any given viewpoint in space, no more than three surfaces of an opaque cube are simultaneously visible. Accordingly, for display with a given viewpoint in mind, only three of presumably six square tiles in a code picture that makes up the cube map need to be decoded. Supporting this, in the high level syntax architecture, the independent Tiles may basically replace independent Slices, at least for applications which require independent Tiles. In other words, scan-order slices would be replaced with what H.263+ Annex K called rectangular slices. Motion constrained tile sets may also be a requirement of the high level syntax architecture.

The general concept of in-picture prediction breaking mechanisms has been a patchwork in both spec space and implementation space. In an embodiment, the high level syntax architecture may include individual flags, one for each prediction mechanism, that govern the prediction import of data for a given Tile and that are placed in the tile header or a parameter set. Accordingly, such implementation may be a better, cleaner, and more flexible solution.

In an embodiment with the high level syntax architecture, tiling may be enabled based on profile used. For example, a very basic tiling mechanism to support straightforward parallelization could be part of all profiles. Also, more advanced techniques could be specified only for certain profiles. For example, a 360 profile using cube maps could allow motion constrained independent Tiles tailored for that application; namely six Tiles that may be arranged in a certain way such as in a 3×2 arrangement, or in a cross-style arrangement. Other profiles may be applicable to other projection formats. For example, an icosahedron-style projection may require more tiles, or comparable prediction-breaking mechanisms that are ideally responsive to the shape of the projections.

Outside of the aforementioned special application driven demands, a Coded Picture becomes the smallest unit which breaks prediction. When a Coded Picture is the smallest unit that breaks prediction, all in-picture prediction mechanisms are never broken, only inter-picture prediction mechanisms are broken. For example, motion compensation and inter-picture prediction of certain metadata, of certain older video coding standards, may be broken. In order to support Coded Pictures without slices/tiles efficiently, the high level syntax architecture of an embodiment may include a picture header to carry the syntax elements that, in H.264/H.265, are placed in the slice header but pertain to the whole picture. One such syntax element may be a reference to a Picture Parameter Set (PPS). As previously provided in a Slice Header, the Picture Header pertains only to the picture it is associated with, and not future pictures. In other words, the content of the Picture Header is transient, and there is no prediction between Picture Headers (otherwise, not even picture-based error resilience would work).

Ignoring error resilience aspects, the Picture Header may be carried in the first (or only) Tile of a picture, or in its own VCL NAL unit. The first is more efficient, the second architecturally cleaner.

In an embodiment, the high level syntax architecture may include the Picture Parameter Set (PPS) and Sequence Parameter Set (SPS) as provided in prior architectures, both in terms of syntax (individuals NAL units), and functionality and persistence scope.

Above the SPS, the high level syntax architecture may include a Decoder Parameter Set (DPS) to include flags, sub-profiles, etc. The content of the DPS may be guaranteed to stay constant during the lifetime of a video stream until an End of Stream NAL unit is received.

In an embodiment using the high level syntax architecture, the embodiment may require a need to allow external carrying of an End of Stream NAL unit. For example, when a SIP re-invite changes the basic parameter of a stream (and has been acknowledged by the decoding system), the decoder of the decoding system must be told to expect a different DPS. It would be disadvantageous if the only way to get such information to the decoder would be to put it into the bitstream, going through start code emulation prevention and the like. Also, placing such information in the bitstream may also not work in practice in certain timeout scenarios.

In many cases, coded pictures will be larger than the maximum transmission unit (MTU) size when conveying them over a packet network. Since introducing unnecessary prediction breaks is bad for coding efficiency (after all, removing slices is done exactly for this purpose), it is preferable to not rely on Tiles. Relying on Tiles is also not preferable as they already carry two possibly contradicting functionalities—parallelization and application specific tiling. It can be argued either way whether or not there is a need for a fragmentation mechanism inside the video codec in spec space. If there is a need for a fragmentation mechanism within the video codec, an embodiment of the high level syntax architecture may use, for example, H.265's "dependent slices", which are just that. Alternatively, fragmentation may be provided at higher layers in the high level syntax architecture. It is noted that many RTP payload formats for H.26× video do contain some form of fragmentation in addition to their reliance on slices for encoder-based MTU size matching (used for gateway scenarios, where the gateway does not transcode).

Figure 5:
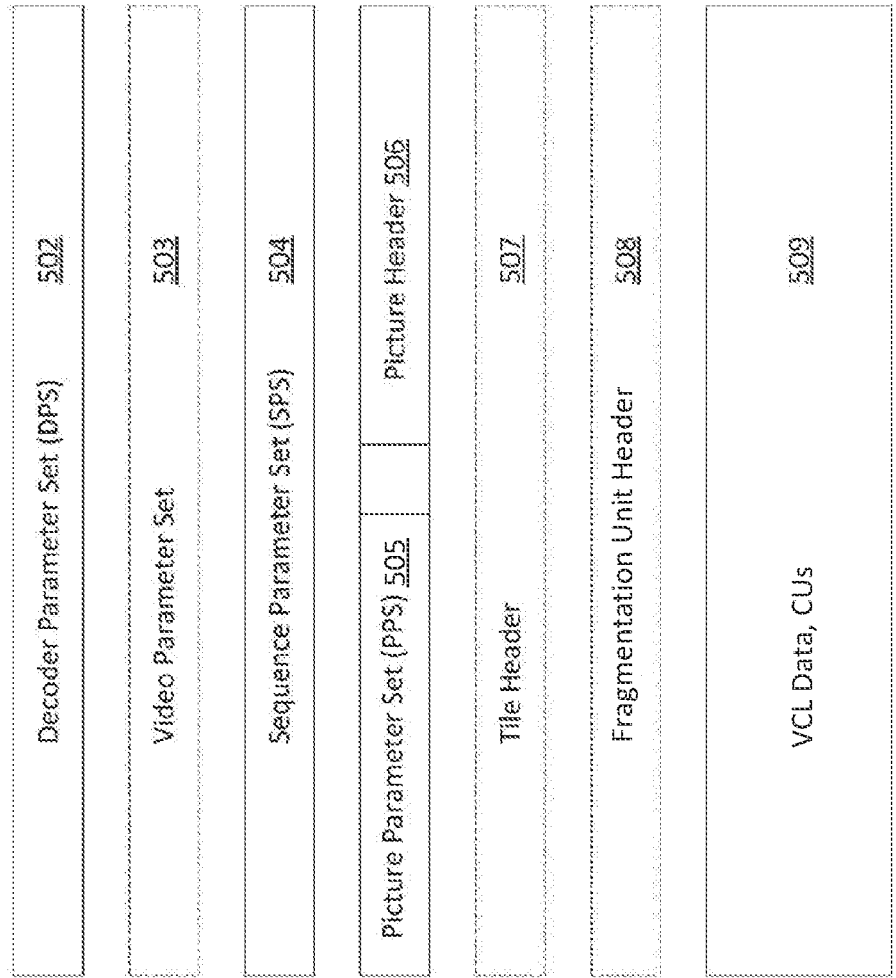
FIG. 5 is a schematic illustration of syntax hierarchies in a high level syntax architecture in accordance with an embodiment.

Referring to FIG. 5, taking the above descriptions in to account, a syntax hierarchy (501) of a high level syntax architecture embodiment may be substantially as follows:

The syntax hierarchy may include a Decoder Parameter Set (DPS) (502), which stays for the lifetime of a session.

In some embodiments, the syntax hierarchy may include a Video Parameter Set (VPS) (503) to tie together scalable layers, wherein the Video Parameter Set breaks at IDR across layers boundaries.

The syntax hierarchy may include a Sequence Parameter Set (SPS) (504) that is substantially similar in functionality as in H.265, scope being a coded video sequence.

The syntax hierarchy may include a Picture Parameter Set (PPS) (505) and a Picture Header (PH) (506) at a same semantic level and similar scope. That is, the Picture Parameter Set (505) and the Picture Header (506) may cover full coded pictures, but can change from coded picture to coded picture. The Picture Parameter Set (505) may be substantially similar in functionality as in H.265, having a scope of a coded picture. The Picture Header (506) may carry picture-constant data that is likely to change from picture to picture, and may also carry a reference to the Picture Parameter Set (505).

In some embodiments, the syntax hierarchy may include a Tile Header (507) for application scenarios where Tiles are needed.

In some embodiments, the syntax hierarchy may include a Fragmentation Unit Header (508) that may be, for example, a dependent slice header.

The syntax hierarchy may include VCL data of the Coded Picture comprising Coding Unit (CU) data (509).

Aspects of the interaction of the various syntax elements and syntactical levels mentioned above are described below in more detail.

[Picture Header/Picture Parameter Set Interaction]

Figure 6:
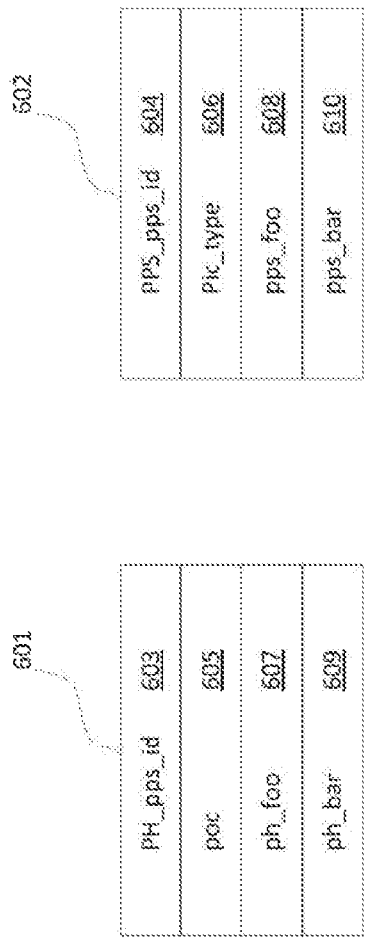
FIG. 6 is a schematic illustration of a picture header and a picture parameter set in accordance with an embodiment.

Referring to FIG. 6, the interaction of the Picture Header (PH) (601) and the Picture Parameter Set (PPS) (602) is described below with respect to an embodiment of the disclosure, wherein both the Picture Header (601) and the Picture Parameter Set (602) address the same syntactical level in the syntax, namely for example a coded picture (509).

With reference to FIG. 6, both PH (601) and PPS (602) can contain certain named syntax elements. As illustrated in FIG. 6, an embodiment may include a PH (601) and a PPS (602) which both contain exactly four syntax elements; however, it is envisioned that PH (601) and PPS (602) can, for example, have any size, have differing size, contain optional elements, and so forth. One of these syntax elements, PH_pps_id (603), can be the reference to the PPS (602) in the PH (601). The semantics for this syntax element can be comparable to the semantics of the pps_id in the Slice Header of older video coding standards, namely to activate the PPS and any downstream higher parameter sets, such as SPS, VPS, DPS, as the case may be. In the PPS (602), the PPS_pps_id (604) can be a self reference, as well as an identification of the PPS's ID upon reception. The Picture Parameter Set identification is an example of a syntax element where, in certain cases, the value of the corresponding syntax element in PH (601) and PPS (602) must be the same for every compliant bitstream.

Certain syntax elements may be present in the PH (601) only, and not in the PPS (602). In at least some cases, such syntax elements may pertain to the picture in whose PH (601) they are included and are likely to change from one picture to the next. Therefore, putting them into a parameter set such as the PPS (602) can be inefficient, as substantially every time a new picture is being decoded, a new PPS (602) would need to be activated. One example for such a syntax element can be an identification of the picture currently being processed, such as, for example, a temporal reference, picture order count number, and similar. For example, the PH (601) may include a POC (605). The corresponding entry in the PPS (602) is labelled pic_type (606) for picture type; this is an example for a syntax element that may be present only in the PPS (602) and not in the PH (601). Accordingly, for all pictures where the PPS (602) is activated, the value of pic_type (606) is used.

Certain syntax elements may be present in the PPS (602) only, and not in the PH (601). It is envisioned that most larger syntax elements that may or likely pertain to multiple coded pictures, but are not applicable to the whole coded video sequence, may be in this category. Such a syntax element may also be present in the PPS (602), but not in the PH (601), when it is unlikely that the syntax element would change from picture to picture and, therefore, the activation of a different PPS (602) would not constitute a burden. As an example, consider complex and potentially large data sets such as scaling matrix, which may allow for several (up to: all) transform coefficients to individually select a quantizer parameter. Such data is unlikely to change over the course of a typical group of pictures (GOP) within a given picture type, such as I pictures, P pictures, and B pictures. Placing the scaling list information in the PH would have the disadvantage that a potentially identical scaling list needs to be retransmitted with potentially each coded picture, as the PH is transient in nature.

There can be, however, a third class of syntax elements. Such syntax elements may have similar names such as, for example pps_foo (608) and ph_foo (607), and may be present in both PPS (602) and PH (601). The relationship between these syntax elements can be defined in the video technology or standard according to the nature of the syntax element, and can be different from syntax element to syntax element in this class.

For example, in the same or another embodiment, in some cases, the value of a syntax element in the PH (601), such as ph_foo (607), may overwrite the value of a similarly named and semantically bound syntax element in the PPS (602), such as pps_foo (608).

In the same or another embodiment, in certain other cases, the value of another syntax element in the PH (601), such as ph_bar (609), uses the similarly named (here: "bar") and semantically bound syntax element in the PPS (602), such as pps_bar (610), as some form of a predictor. For example, in some cases, the PH based syntax element (609) can be added, subtracted, etc., to/from the similarly named and semantically bound syntax element (610) in the PPS (602).

[Decoder Parameter Set and Bitstream Termination]

A Decoder Parameter Set (DPS) (502) bears a lot of similarity of MPEG-2's Sequence Header, but it is a parameter set. Accordingly, unlike the Sequence Header MPEG-2, the DPS (502) is not of a transient nature. Certain activation rules can apply to parameter sets that are different from headers such as MPEG-2's sequence header, in that the activation time can be different than the decoding time of the parameter set or header, respectively. With this important difference in mind, SPS may be compared to the GOP header of MPEG-2, and the DPS may be compared to the Sequence Header of MPEG-2.

The DPS (502) may have a scope that H.265 calls a video bitstream. A video bitstream can comprise many coded video sequences (CVS). There are certain elements in H.264 and H.265 that have a scope that goes beyond a given CVS, first and foremost the HRD parameters. In spec space, H264 and H.265 deal with parameters above the CVS level by putting them in the SPS and requiring that the relevant information stays constant between SPSs activated in each coded video sequence. The DPS, of an embodiment of the disclosure, can accumulate those syntax elements into a structure that can stay known and constant for many CVSs.

One aspect previously not envisioned is how to signal to a decoder that, from a given point in time, the decoder has to be prepared to accept parameter sets that would require a different DPS. Such parameter sets may be, for example, DPSs or SPSs where need-to-be-constant parameters are changed, While H.264 and H.265 both contain an End of Stream NAL unit (EOS), the NAL unit may not be in frequent use, at least partially due to an architectural shortcoming as described below.

In H.264 and H.265, unlike a few other NAL unit types such as parameter sets, the EOS needs to be conveyed in the coded video bitstream, and has well defined constraints for its placement. For example, in H.264 or H.265, EOS cannot be placed within a coded picture's VCL NAL units. In practice, the cooperation of the encoder or another entity aware of (at least) the video coding standard's high level syntax constraints is required to insert the EOS NAL unit at an appropriate location in the coded video bitstream. In at least some scenarios, such cooperation is not practical. For example, referencing the communication system of FIG. 1, assuming a receiving terminal drops out of network coverage, and the terminal was in the middle of receiving NAL units belong to a coded picture, the encoder cannot provide the decoder with an EOS NAL unit, because it is not connected to the decoder anymore. Splicing in the EOS NAL unit at the receiver will not work either because the connection broke while receiving NAL units of a coded picture, and an EOS cannot be placed between NAL units of a coded picture. In a real-world application, the receiving terminal may reset its decoder to a known fresh state, but such operations can take several seconds. While that may be acceptable for the scenario presented, there may be other scenarios where a quicker and better defined reaction of the decoder can be required.

In the same or another embodiment of the disclosure, the EOS can be received either as part of the video stream (as in H.264/H.265), or out of band.

Figure 7:
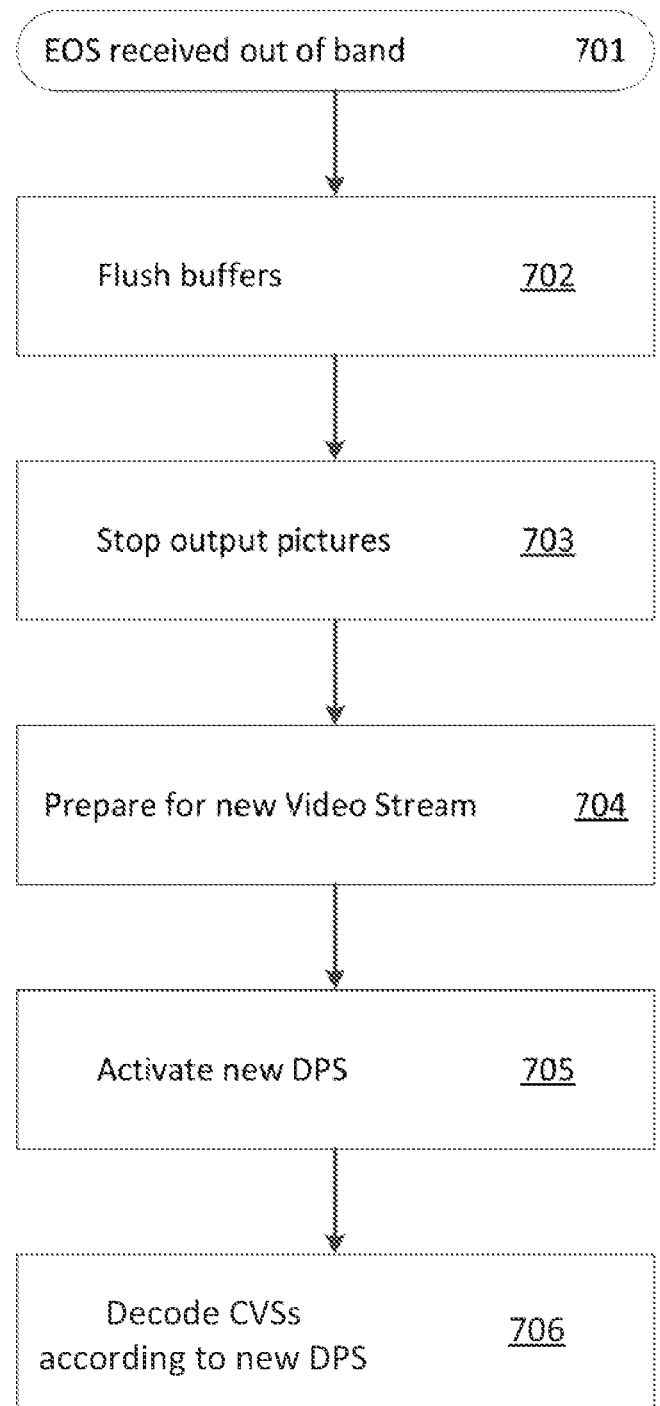
FIG. 7 is a schematic illustration of a flowchart for decoder parameter set change when an end of stream is received out of band, in accordance with an embodiment.

Referring to FIG. 7, in the same or another embodiment, when an EOS is received out of band (701) and processed, the decoder may deactivate an active Decoder Parameter Set of the video stream. The deactivation of the active Decoder Parameter Set (DPS) means that a different DPS with at least one value being different from the previously active DPS can be activated without a syntax violation.

For example, the deactivation of the active DPS may include the decoder immediately flushing its buffers (702) and stopping output of reconstructed pictures (703). Following deactivation of the previously active DPS, the decoder may prepare itself for the reception of a new video stream (704), wherein the new video stream may have a DPS content that differs from the previous DPS. The decoder may then commence decoding a new video stream by (optionally decoding and) activating either the previous or a new DPS (705), wherein the new DPS may be different from the old DPS. The reception and decoding of a new DPS may occur at any time, even before the EOS is received out of band. As common for parameter sets, the timing of reception and decoding of a parameter set is irrelevant for the decoding process as long as it is present upon time of its activation. Thereafter, decoding of new CVSs according to the new DPS can commence (706).

The techniques for high level syntax, described above, can be implemented as computer software using computer-readable instructions and physically stored in one or more computer-readable media. For example, FIG. 8 shows a computer system (800) suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
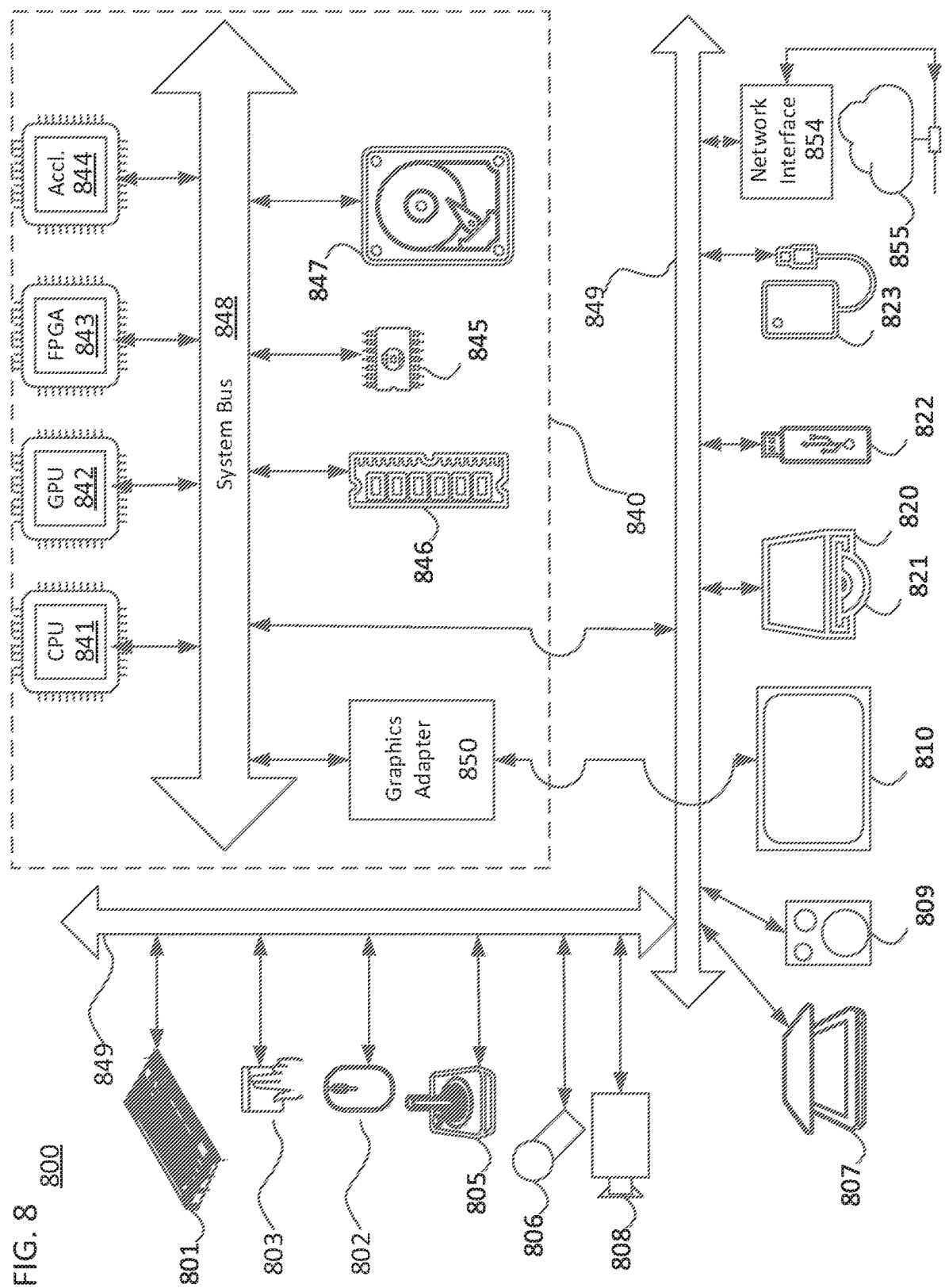
FIG. 8 is a schematic illustration of a computer system in accordance with an embodiment.

The components shown in FIG. 8 for computer system (800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system (800).

Computer system (800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (801), mouse (802), trackpad (803), touch screen (810), data-glove, joystick (805), microphone (806), scanner (807), camera (808).

Computer system (800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (810), data glove, or joystick (805), but there can also be tactile feedback devices that do not serve as input devices). For example, such devices may be audio output devices (such as: speakers (809), headphones (not depicted)), visual output devices (such as screens (810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (800) can also include human accessible storage devices and their associated media such as optical media including CD/DVD ROM/RW (820) with CD/DVD or the like media (821), thumb-drive (822), removable hard drive or solid state drive (823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (800) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (849) (such as, for example USB ports of the computer system (800); others are commonly integrated into the core of the computer system (800) by attachment to a system bus as described below (for example Ethernet interface into a PC computer system or cellular network interface into a smartphone computer system). Using any of these networks, computer system (800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (840) of the computer system (800).

The core (840) can include one or more Central Processing Units (CPU) (841), Graphics Processing Units (GPU) (842), specialized programmable processing units in the form of Field Programmable Gate Areas (FPGA) (843), hardware accelerators for certain tasks 844, and so forth. These devices, along with Read-only memory (ROM) (845), Random-access memory (846), internal mass storage such as internal non-user accessible hard drives, SSDs, and the like (847), may be connected through a system bus (848). In some computer systems, the system bus (848) can be accessible in the form of one or more physical plugs to enable extensions by additional CPUs, GPU, and the like. The peripheral devices can be attached either directly to the core's system bus (848), or through a peripheral bus (849). Architectures for a peripheral bus include PCI, USB, and the like.

CPUs (841), GPUs (842), FPGAs (843), and accelerators (844) can execute certain instructions that, in combination, can make up the aforementioned computer code. That computer code can be stored in ROM (845) or RAM (846). Transitional data can be also be stored in RAM (846), whereas permanent data can be stored for example, in the internal mass storage (847). Fast storage and retrieve to any of the memory devices can be enabled through the use of cache memory, that can be closely associated with one or more CPU (841), GPU (842), mass storage (847), ROM (845), RAM (846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (800), and specifically the core (840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (840) that are of non-transitory nature, such as core-internal mass storage (847) or ROM (845). The software implementing various embodiments of the present disclosure can be stored in such devices and executed by core (840). A computer-readable medium can include one or more memory devices or chips, according to particular needs. The software can cause the core (840) and specifically the processors therein (including CPU, GPU, FPGA, and the like) to execute particular processes or particular parts of particular processes described herein, including defining data structures stored in RAM (846) and modifying such data structures according to the processes defined by the software. In addition or as an alternative, the computer system can provide functionality as a result of logic hardwired or otherwise embodied in a circuit (for example: accelerator (844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for decoding a coded picture coded according to a video codec technology or standard that uses a syntax structure including a Picture Header and at least one Picture Parameter Set (PPS), the method comprising:
   decoding the coded picture, comprising:
   decoding, by a decoder, the Picture Header, the Picture Header comprising transient information pertaining to a plurality of Coding Units of the coded picture, and the transient information of the Picture Header including at least one reference to the at least one PPS, and further including at least one first syntax element pertaining to an aspect of the video codec technology or standard for decoding; and activating, by the decoder, a PPS of the at least one PPS that is decoded, the PPS comprising a second syntax element pertaining to the aspect of the video codec technology or standard for decoding;

determining whether a value, that relates to the aspect of the video codec technology or standard, of the Picture Header is in contradiction with a value, that relates to the aspect of the video codec technology or standard, of the second syntax element of the PPS; and using, by the decoder in decoding the coded picture, one of the value of the first syntax element, the value of the second syntax element, or a combination of the value of the first syntax element and the value of the second syntax element, in accordance with a result of the determining, wherein the value of the first syntax element is determined to be in contradiction with the value of the second syntax element based on the value of the first syntax element being different from the value of the second syntax element.

2. The method of claim 1, wherein
the Picture Header includes a third syntax element, and the PPS does not include a syntax element that corresponds to the third syntax element.

3. The method of claim 1, wherein
the using comprises using either the first syntax element or the second syntax element in decoding the coded picture in a case where the value of the first syntax element and the value of the second syntax element are the same and the video codec technology or standard is in use.

4. The method of claim 1, wherein
the using comprising using, by the decoder, the value of the first syntax element in decoding the coded picture in a case where the value of the first syntax element and the value of the second syntax element are different.

5. The method of claim 1, wherein
the using comprises using, by the decoder, the value of the second syntax element in decoding the coded picture in a case where the value of the first syntax element and the value of the second syntax element are different.

6. The method of claim 1,
the using comprises, in a case where the value of the first syntax element and the value of the second syntax element are different and the video codec technology or standard is in use:
mathematically combining, by the decoder, the value of the first syntax element and the value of the second syntax element into a combination, and
using the combination in decoding the coded picture.

7. The method of claim 6, wherein
the value of the second syntax element is used as a predictor for the first syntax element.

8. The method of claim 1, wherein
the decoding the coded picture further comprises overwriting, by the decoder, the value of the second syntax element with the value of the first syntax element in a case where the value of the first syntax element and the value of the second syntax element are different and the video codec technology or standard is in use.

9. The method of claim 1, wherein
the PPS includes a third syntax element, and the Picture Header does not include a syntax element that corresponds to the third syntax element.

10. The method of claim 1, wherein
the third syntax element is used by the decoder to identify a picture being processed by the decoder or includes information pertaining to multiple coded pictures.

11. A device for decoding a coded picture coded according to a video codec technology or standard that uses a syntax structure including a Picture Header and at least one Picture Parameter Set (PPS), the device comprising:
a decoder configured to decode the coded picture by:
decoding the Picture Header, the Picture Header comprising transient information pertaining to a plurality of Coding Units of the coded picture, and the transient information of the Picture Header including at least one reference to the at least one PPS, and further including at least one first syntax element pertaining to an aspect of the video codec technology or standard for decoding;
activating a PPS of the at least one PPS that is decoded, the PPS comprising a second syntax element pertaining to the aspect of the video codec technology or standard for decoding
determining whether a value, that relates to the aspect of the video codec technology or standard, of the Picture Header is in contradiction with a value, that relates to the aspect of the video codec technology or standard, of the second syntax element of the PPS; and
using, in the decoding, one of the value of the first syntax element, the value of the second syntax element, or a combination of the value of the first syntax element and the value of the second syntax element, in accordance with a result of the determining,
wherein the value of the first syntax element is determined to be in contradiction with the value of the second syntax element based on the value of the first syntax element being different from the value of the second syntax element.

12. The device of claim 11, wherein
the Picture Header includes a third syntax element, and the PPS does not include a syntax element that corresponds to the third syntax element.

13. The device of claim 11, wherein
the decoder is configured to use either the first syntax element or the second syntax element in decoding the coded picture in a case where the value of the first syntax element and the value of the second syntax element are the same and the video codec technology or standard is in use.

14. The device of claim 11, wherein
the decoder is configured to use the value of the first syntax element in decoding the coded picture in a case where the value of the first syntax element and the value of the second syntax element are different.

15. The device of claim 11, wherein
the decoder is configured to use the value of the second syntax element in decoding the coded picture in a case where the value of the first syntax element and the value of the second syntax element are different.

16. The device of claim 11, wherein
the decoder is configured to, in a case where the value of the first syntax element and the value of the second syntax element are different and the video codec technology or standard is in use:

mathematically combine, by the decoder, the value of the first syntax element and the value of the second syntax element into a combination, and use the combination in decoding the coded picture.

17. The device of claim 16, wherein the value of the second syntax element is used as a predictor for the first syntax element.

18. The device of claim 11, wherein the decoder is further configured to overwrite the value of the second syntax element with the value of the first syntax element in a case where the value of the first syntax element and the value of the second syntax element are different and the video codec technology or standard is in use.

19. The device of claim 11, wherein the PPS includes a third syntax element, and the Picture Header does not include a syntax element that corresponds to the third syntax element.

20. A non-transitory computer-readable medium storing instructions, the instructions comprising: one or more instructions that, when executed by one or more processors of a device, cause the one or more processors to:

decode a coded picture coded according to a video codec technology or standard that uses a syntax structure including a Picture Header and at least one Picture Parameter Set (PPS) by the one or more processor being caused to:

decode the Picture Header, the Picture Header comprising transient information pertaining to a plurality of Coding Units of the coded picture, and the transient information of the Picture Header including at least one reference to the at least one PPS, and further including at least one first syntax element pertaining to an aspect of the video codec technology or standard for decoding;

activate a PPS of the at least one PPS that is decoded, the PPS comprising a second syntax element pertaining to the aspect of the video codec technology or standard for decoding;

determine whether a value, that relates to the aspect of the video codec technology or standard, of the Picture Header is in contradiction with with a value, that relates to the aspect of the video codec technology or standard, of the second syntax element of the PPS; and use, in decoding the coded picture, one of the value of the first syntax element, the value of the second syntax element, or a combination of the value of the first syntax element and the value of the second syntax element, in accordance with a result of the determining, wherein the value of the first syntax element is determined to be in contradiction with the value of the second syntax element based on the value of the first syntax element being different from the value of the second syntax element.

\* \* \* \* \*